United States Patent [19]

Thompson

[11] Patent Number: 5,122,667
[45] Date of Patent: Jun. 16, 1992

[54] MEANS FOR MEASURING THE DEPTH INTERACTION OF GAMMA-RAYS IN SCINTILLATION CRYSTALS IN ORDER TO IMPROVE THE SPATIAL RESOLUTION OF POSITRON IMAGING SYSTEMS

[75] Inventor: Christopher J. Thompson, Montreal, Canada

[73] Assignee: The Royal Institute For The Advancement of Learning, Montreal, Canada

[21] Appl. No.: 448,202

[22] Filed: Dec. 8, 1989

[30] Foreign Application Priority Data

Dec. 14, 1988 [CA] Canada ................... 585865

[51] Int. Cl.⁵ .................. G01T 1/20; G01T 1/202; G01T 1/208; G01T 1/164
[52] U.S. Cl. .................. 250/363.03; 250/363.01; 250/363.02; 250/363.03; 250/366; 250/367
[58] Field of Search .................. 250/367, 366, 363.06, 250/363.05, 363.04, 363.03, 363.02, 363.01

[56] References Cited

U.S. PATENT DOCUMENTS

| 4,647,779 | 3/1987 | Wong | 250/363.03 |
| 4,677,299 | 6/1987 | Wong | 250/363.03 |
| 4,743,764 | 5/1988 | Casey et al. | 250/363.03 |
| 4,823,016 | 4/1989 | Yamashita et al. | 250/363.03 |
| 4,841,153 | 6/1989 | Wormald | 250/390.04 |
| 4,843,245 | 6/1989 | Lecomte | 250/367 |
| 4,870,280 | 9/1989 | Yamashita et al. | 250/368 |

Primary Examiner—Constantine Hannaher
Assistant Examiner—Edward J. Glick
Attorney, Agent, or Firm—Oliff & Berridge

[57] ABSTRACT

Arrays of scintillation crystals disposed on the circumference of a cylinder are used to detect the annihilation photons emitted after positron decay of isotopes within a body section. At the point of equi-probable depth of gamma ray interaction the surface treatment of each crystal is modified to absorb the light which otherwise would have been reflected by a small length of that surface. While light emitted from the rear of the crystal is nearly constant with depth, light emitted from the top front of the crystal is much reduced if the gamma ray interacts behind the absorbing band. When readout devices measure the light emitted from the top-front and rear face simultaneously it is possible to detect the region of interaction. This can be used to improve the spatial resolution of a positron imaging system.

15 Claims, 4 Drawing Sheets

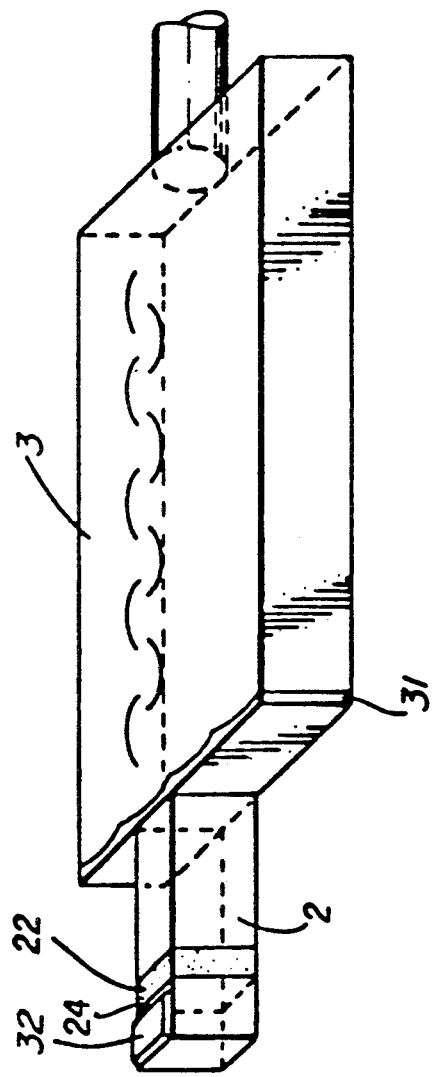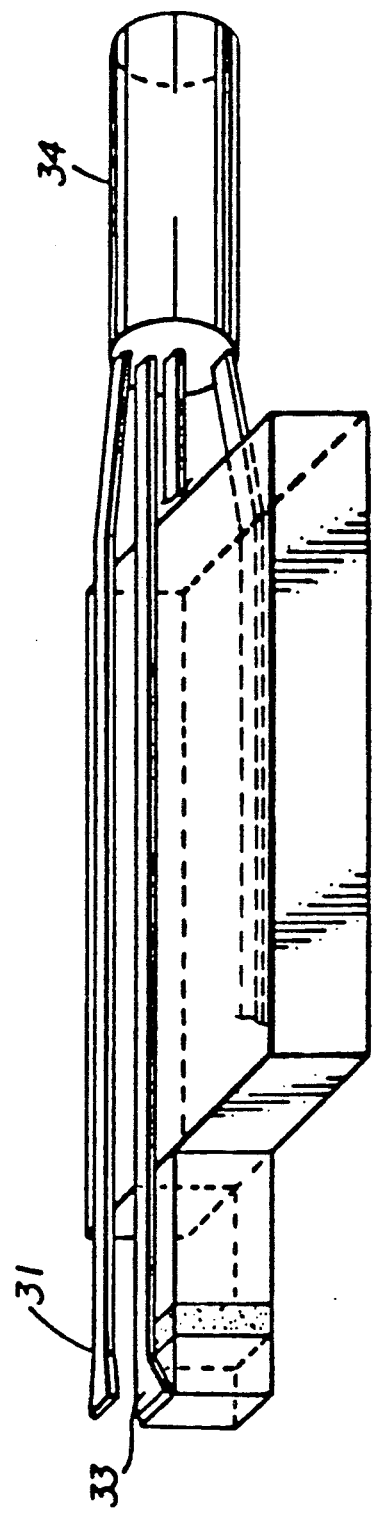

INT CRT RTS SPMT NOBAND-BAND8

MEANS FOR MEASURING THE DEPTH INTERACTION OF GAMMA-RAYS IN SCINTILLATION CRYSTALS IN ORDER TO IMPROVE THE SPATIAL RESOLUTION OF POSITRON IMAGING SYSTEMS

BACKGROUND OF THE INVENTION

1. Field of the Invention

This invention relates generally to positron emission tomography, a sub-field of the class of medical imaging techniques using ionizing radiation and image reconstruction techniques; and more particularly to devices which use an array of scintillation detectors to detect the annihilation radiation from positron disintegration and use this information to reconstruct an image of the distribution of positron emitting isotope within a body section.

2. Description of the Prior Art

Positron emission tomography is a technique for measuring the concentration of a positron emitting isotope through sectional planes or within a defined volume of the body (for medical research and diagnostic purposes). Normally the isotope is used to label a substance which circulates in the blood and accumulates in certain tissues. The regional concentration of the isotope may be measured if the device is suitably calibrated. The ability to quantitate the regional concentration depends on the spatial resolution of the system. The ultimate limit of the spatial resolution depends on the positron decay process and subsequent production of two annihilation gamma ray photons.

Some isotopes whose nuclei have more protons than neutrons decay by transforming a proton into a positive electron (positron) and a neutrino. The positron is ejected with variable kinetic energy which is lost in many collisions with electrons in the body tissue. The distance travelled depends on the initial energy and the electron density and is typically 0.5 to 2 mm for common isotopes in medical use. The positron finally interacts with an electron, and because they are each other's anti-particles, they annihilate each other normally creating two gamma rays with 511 keV energy which travel in opposite directions. Because the electron and positron are moving at the time of annihilation, the pair of gamma rays, although collinear in the moving frame of reference appear to be slightly angulated by about ½ of a degree when imaged by detecting crystals.

The positron range and apparent non-collinearity of the annihilation gamma rays determine the ultimate limits of the spatial resolution. This limit cannot be obtained in practice due to penetration by the gamma rays into the detectors. The 511 keV intrinsic energy of these gamma rays gives them a mean free path of several millimeters even in the densest of materials like lead. Modern imaging systems attempt to minimize the blurring of the detectors by (1) using very dense scintillation crystals such as bismuth germanate, (2) making the crystals very narrow or, (3) using imaging means to determine the location of the interaction of the gamma ray in larger crystals. The detection of an event useful in image formation requires the simultaneous recording of each of the pair of annihilation photons. The nucleus which emitted the positron is assumed to have been on the line joining the points of interaction of the two gamma rays.

When this line is close to a diameter of the circle on which the crystals are disposed, and the crystals are made narrow, the depth of interaction is not important since the crystal could be made deep enough to ensure the gamma rays will almost always be absorbed. When the line is far from being a diameter both of the gamma rays may pass through one or several crystals before being absorbed. This causes a broadening of the coincidence aperture function towards the edges of the field of view.

In modern imaging systems with crystals 3-4 mm wide the spatial resolution is about twice as bad at the edge of the field of view as at the centre. If the crystals are made narrower than 3 mm the blurring due to the positron range and non-collinearity dominate the resolution loss for diametrically opposed crystals, so the resolution improvement gained by using even narrower crystals is not significant. If the crystals are made deeper the resolution loss at the edge is more severe, so there is compromise between deeper crystals which improve total system sensitivity and resolution loss at the edges.

OBJECTS AND SUMMARY OF THE INVENTION

Accordingly it is the main object of this invention to provide detection elements for a positron imaging system which minimize the resolution blurring at the edge of the field of view while maintaining excellent sensitivity.

Another object of this invention is to provide a simple technique to determine with only the minimum accuracy required a measure of the depth of interaction of gamma rays in the crystal. Another object of this invention is to allow the depth of interaction to be recorded simultaneous by the same light sensing means, for all the plurality of crystals which are grouped onto a lesser number of primary light sensing means via encoding schemes which are already known to those skilled in the art.

In accordance with one aspect of this invention the detecting elements will be discrete, dense transparent scintillation crystals made of a material such as bismuth germinate. These crystals will be generally in the form of right rectangular prisms.

In accordance with another aspect of this invention the treatment of all surfaces not in optical contact with the light sensing means shall be the same, either polished, or smoothed, and covered with a highly reflective white substance except as specified below.

In accordance with another aspect of this invention a narrow band of reduced light reflectively is imposed on the surfaces of the crystal near the point of equi-probable depth of interaction. The width of this band is approximately equal to the smallest crystal dimension.

In accordance with another aspect of this invention an auxiliary light sensing means is provided to record light from that region of the crystal in front of the band of reduced reflectivity.

In accordance with another aspect of this invention, the same light sensing means may be used to record gamma rays which interact in the front region of any of a group of crystals comprising a detector module.

In accordance with another aspect of this invention the scintillation crystals may be disposed on a circular array such that a line diagonally through the opposite corners of the crystal prism would be aligned with a radius of the circle, in order to provide sufficient samples to reconstruct an image of the body section under study without moving the detector array. In accordance with the foregoing aspects of the invention there is provided:

A scintillation detector for use in the detection of annihilation radiation from the positron decay process, said detector comprising one or a plurality of generally right rectangular crystal prisms, one end of said prism(s) in optical contact with a primary light sensing means, the opposite end face(s) exposed to said radiation, the other surfaces of said prism(s) having been rendered highly reflective except for a narrow light absorbing band surrounding the prism at the point of equi-probable interaction of said radiation, and providing auxiliary light sensing means for independent readout of light arising interaction of said radiation when said interaction occurs in front of the said light absorbing band.

BRIEF DESCRIPTION OF THE DRAWINGS

The preferred embodiment of the invention will now be described with reference to the accompanying drawings on which:

FIG. 3a is a diagrammatic, perspective view illustrating a scintillation crystal optically coupled to primary and secondary light sensing detectors;

FIG. 3b is a diagrammatic, perspective view of an alternative embodiment of a scintillation crystal optically coupled to primary and secondary light sensing detectors;

DESCRIPTION OF THE PREFERRED EMBODIMENT

Figure 1:
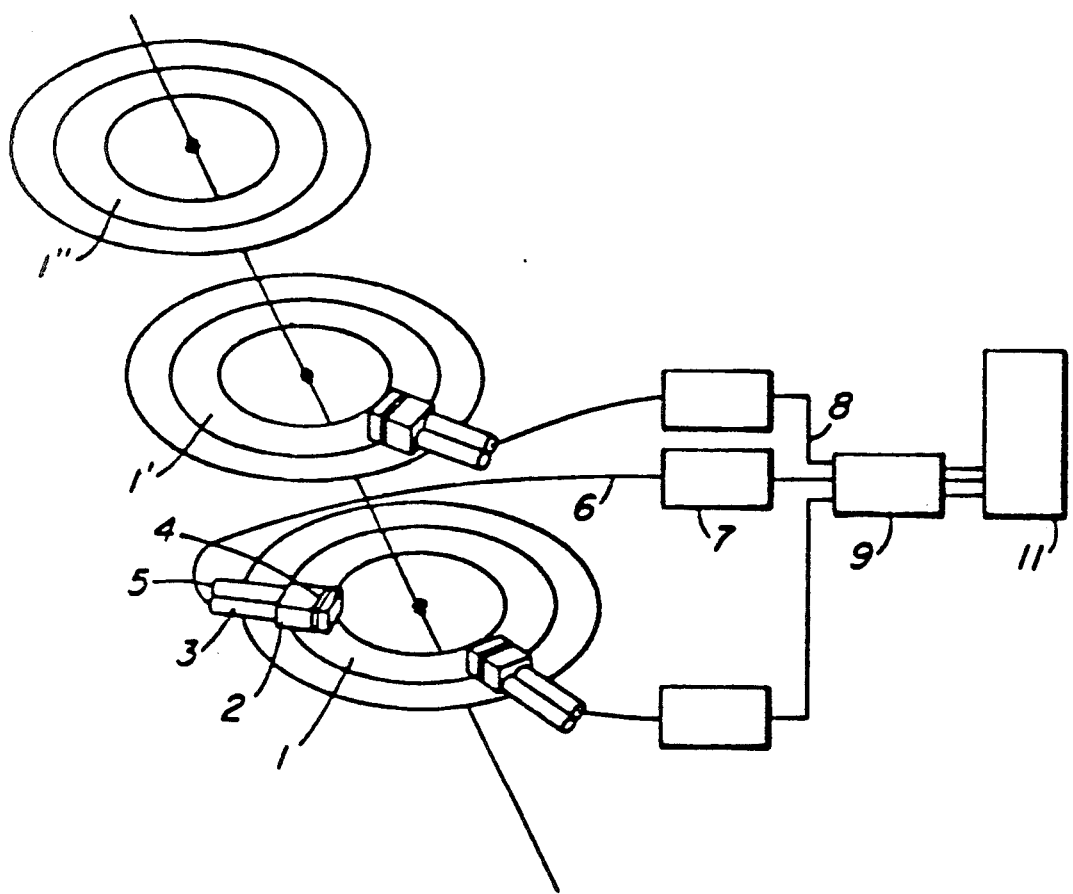
FIG. 1 is an overall block diagram of the apparatus.

Referring now to FIG. 1 there is shown a series of rings 1, 1', 1" etc. each ring mutually disposed about a common axis. Each ring is comprised of a plurality of discrete detector modules containing one or more crystal detectors 2, a primary light sensing means 3, means of coupling the light from the front of each crystal 4, to the auxiliary light sensing means 5. Electrical signals from the primary and secondary light sensing means are coupled via cables 6, to amplifiers and position and energy encoding circuits 7. When an event has been encoded, and its energy determined to correspond with an un-scattered annihilation photon a coded signal is sent over further cables 8, to a coincidence circuit 9. If the coincidence circuit receives signals from exactly two, non adjacent, detector modules within a short time (a few nanoseconds), the addresses of each end of each crystal are used to determine and address to increment in a memory storage module 11. The contents of the storage memory are read out from time to time and are processed by conventional image reconstruction techniques. The essential distinction between this and conventional imaging systems is that depth of interaction in each crystal is provided as part of the coded address of each event.

Figure 2:
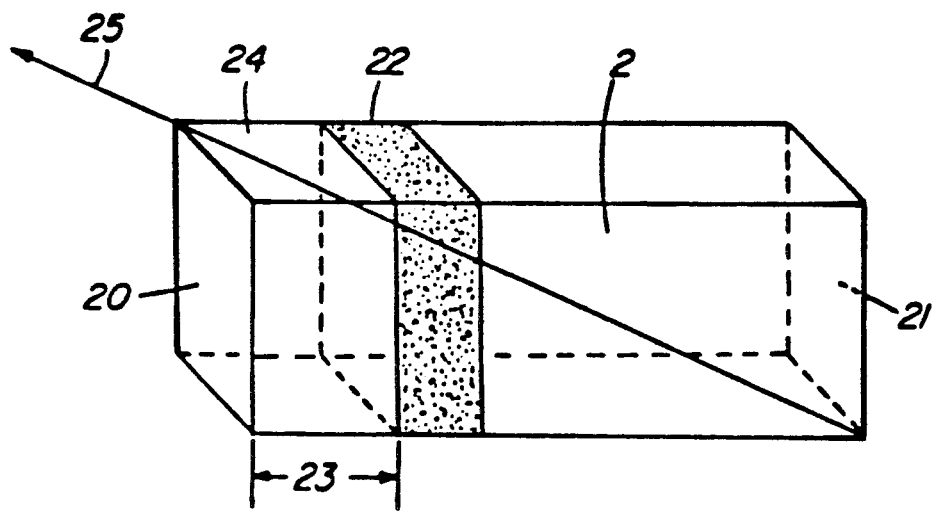
FIG. 2 is an isometric view of one crystal showing the light absorbing band and orientation in the array.

Referring now to FIG. 2 which shows one of the discrete crystals 2, which is generally in the form of a right rectangular prism. The radiation enters through the front face 20, of the crystal which is disposed near the surface of a hollow cylinder which surrounds the patient section being scanned. The rear face of the crystal 21, is optically coupled to the primary light sensing means. The surfaces not in contact with light sensors are either highly polished or etched and covered with a highly reflecting white substance. The light absorbing band 22, is located near the equi-probable point of interaction 23, from the front face. It can either be etched on the surface of a polished crystal (to eliminate total internal reflection which normally takes place at the crystal-air interface), or rendered black to absorb light which would have escaped via refraction from the crystal, and would normally be reflected back from the white material or paint on the crystal faces. Note because of the exponential attenuation of radiation within the crystal the distance 23, is always less than half the length of the length of the crystal. The face 24 is coupled to the secondary light sensing means. The crystals are disposed in the rings such that the line 25, joining opposite corners of the crystal is directed towards the centre of the cylinder in order to provide spatially distinct samples from front and rear sections of the crystal. The front face may be cut slightly skewed to the other faces in order to prevent the light from reflecting endlessly from the highly polished faces of the crystal due to total internal reflection.

Referring now to FIG. 3 which shows the disposition of the light detecting means FIG. 3a shows one of several crystals 2, coupled through an optional light guide 31, to a multiple cathode photomultiplier as the primary light sensing means 3. In one embodiment a high gain, low noise, semiconducting photo diode 32, coupled to crystal face 24, is used as the secondary light sensing means. In an alternative embodiment, shown in FIG. 3b a light pipe 33 couples the light from crystal face 24, to a common single element photomultiplier 34, to which the front ends of all crystals in the module would also be coupled. Depending on the position encoding scheme employed, the crystals may be coupled to the primary light sensing means through an optional light guide 31 whose purpose is to diffuse the light and assist in the crystal identification. In both of these embodiments the primary light sensing photomultiplier provides timing, energy and crystal identification (using coding schemes already known to those skilled in the art), the secondary light sensing means provides a binary (front, back) decision to identify the region of each crystal, and may also be used to alter parameters used in the coding scheme of the primary photo multiplier.

Minor modifications of this such as the use of a plurality of primary photomultipliers rather than one multi anode one as drawn here could be employed with a reduction of overall compactness, and greater extent of dead zones due the adjacent glass envelopes in the inner walls of the photomultipliers.

Figure 4A:
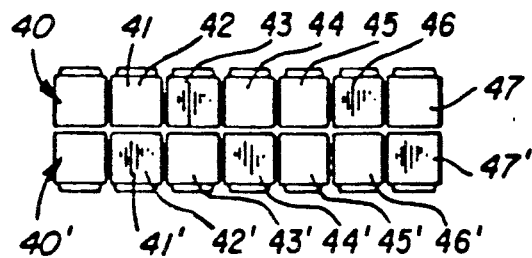
FIGS. 4a, 4b and 4c are end, plan and side elevational views, respectively, illustrating a crystal array coupled to a multi-cathode photomultiplier as the primary light sensing means and the top and bottom of the front sections of the crystals coupled via light guides to secondary light sensing detectors.
Figure 4B:
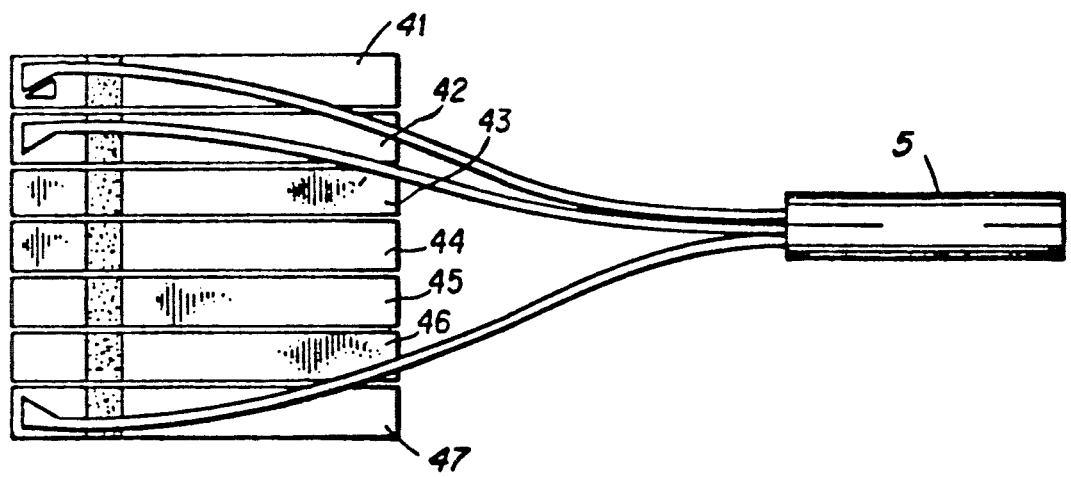
Figure 4C:
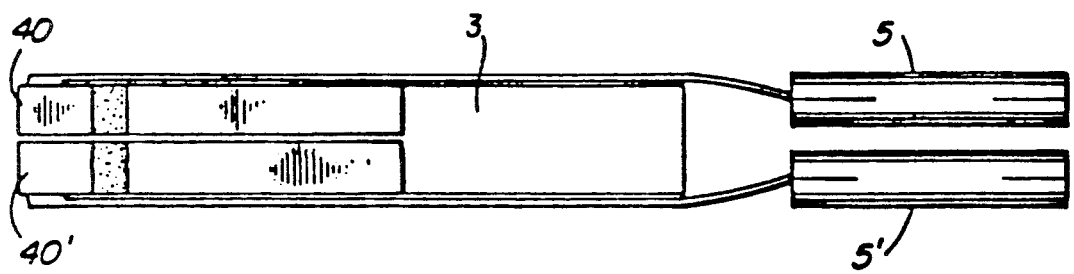

Referring now to FIG. 4 in which another possible embodiment is shown in frontal elevation FIG. 4a, plane elevation FIG. 4b, and side elevation FIG. 4c. Here the crystals 2 are subdivided by a horizontal lengthwise cut into two vertically disposed units 40, 41 coupled to the same primary photomultiplier 3. Light guides 41,42 . . . 47 couple each crystal in the upper row to a secondary photomultiplier 5 while further light guides 41', 42' ... 43' ... 47' couple each crystal in the lower row to a secondary photomultiplier 5'.

Figure 5:
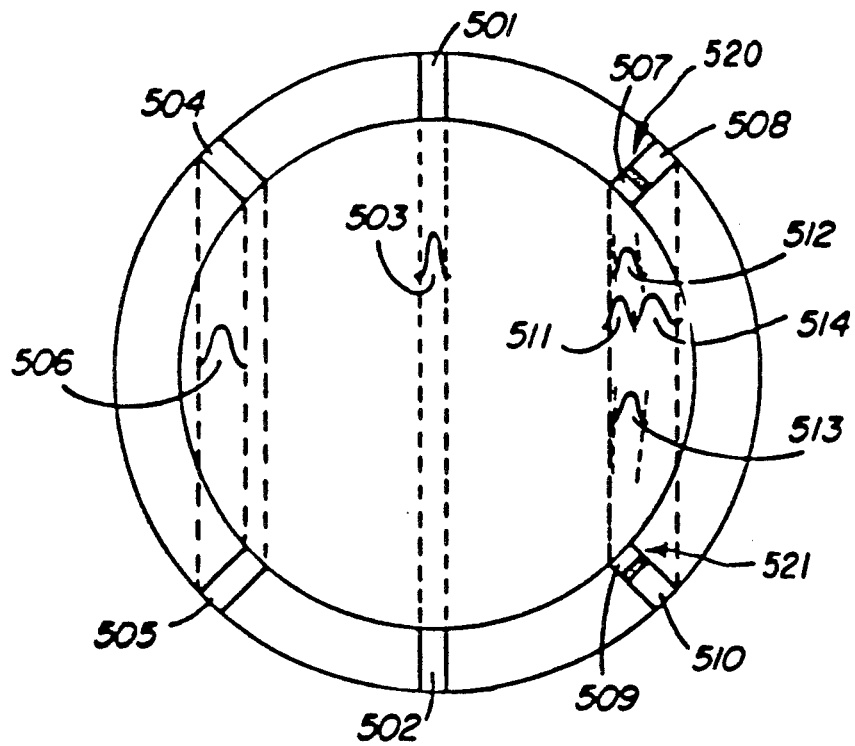
FIG. 5 shows the advantage of the invention in reducing the width of the coincidence aperture functions.
Figure 6:
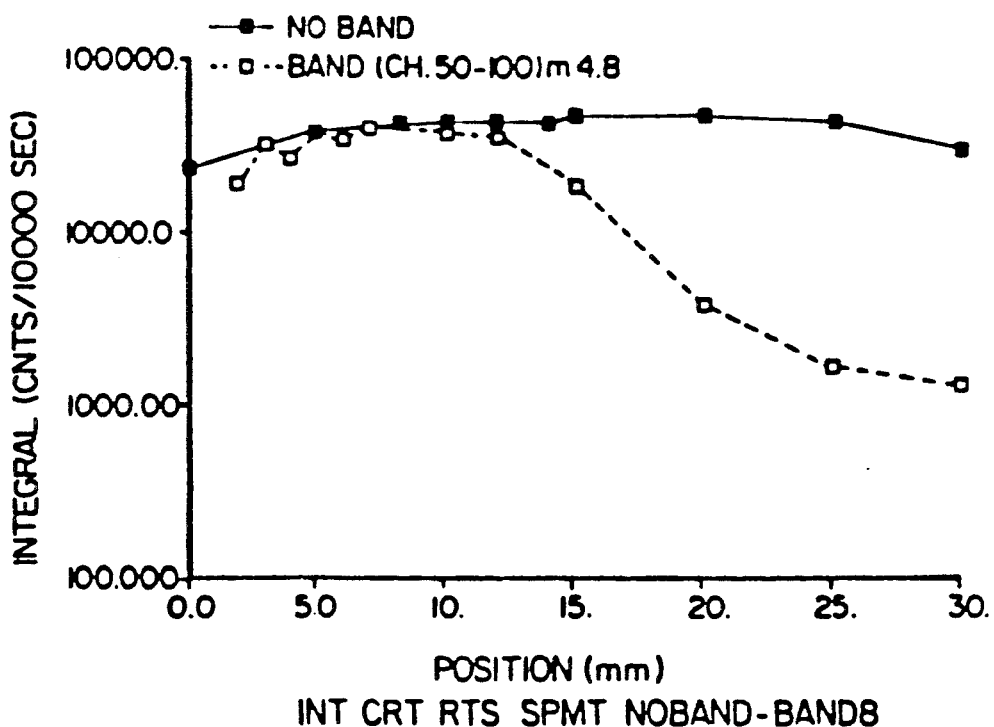
FIG. 6 shows a response function with and without the band around the crystal.

Referring now to FIG. 5 which shows the coincidence aperture functions which can be measured by a moving a point source of positron emitting isotope in the plane of the detectors and observing the number of coincident events recorded by all pairs of crystals. Crystals 501 and 502 are diametrically opposed. Their response 503 is not effected by penetration of the gamma rays. Crystals 504 and 505 respond to events near the edge of the field of view. The response 506, is blurred since many gamma rays recorded by them have passed through neighboring crystals without being absorbed. Crystals 520 and 521 are divided into regions 507, 508 and 509, 510, respectively, along the plane of equi-probable interaction. There are four aperture functions with equal areas, 511 from coincidences between regions 507 and 509, 512 from coincidences between regions 507 and 510, 513 from coincidences between regions 508 and 509, and 514 from coincidences between regions 508 and 510. The sum of the integrals of 511, 512, 513, and 514 is equal to 506, so the efficiency is the same, but the widths of the former are much narrower, improving spatial resolution at the edge of the field of view.

THE FOLLOWING ADVANTAGES ARE MADE WITH REGARD TO THIS INVENTION:

The single discrete crystals of a dense material like bismuth germanate can be made relatively deep to improve sensitivity while preventing image blurring at the edge of the field of view.

A simple inexpensive means is employed to identify whether the gamma ray interacts with the front or rear section of the crystal using a light absorbing band and secondary light sensing means.

The light absorbing band divides the crystal into two regions such that a gamma ray is equally likely to interact with the crystal in front of or behind the band. It follows that coincident events involving a pair of these crystals will divide into four equi-probable groups. Previous schemes which propose detectors made out different scintillators glued together and electronic pulse shape discrimination do not give this event distribution. Since the noise in the final image is due to the regions where the counting statistics are poorest, separation into equi-probable interaction regions will reduce image noise. Since all other scintillators currently known are less dense than bismuth germinates it follows that using a multi-element crystal will result in reduced efficiency if the overall crystal depth is constant, or increased resolution blurring if the crystals are made deeper to retain efficiency.

Other embodiments falling within the lines of the appended claims will occur to those skilled in the art.

The embodiments of the invention in which an exclusive property or privilege is claimed are defined as follows:

1. A scintillation detector for use in detecting annihilation gamma rays resulting from positron decay of isotopes distributed within a body section, said detector comprising:
    a body formed from a dense scintillator material and having reflective surfaces except for a non-reflecting band surrounding said body about a transverse plane of equi-probable interaction of annihilation radiation within said body, a first end face at one end of said body for receiving and admitting gamma rays into the interior of said body, a second end face at the opposite end of said body and substantially paralleling said first end face for transmitting light from scintillation due to interaction of gamma rays in said body to a primary light sensing means, and a third face on a side of said body between said first end face and said non-reflecting band for transmitting light to a secondary light sensing means and preferentially detecting light emanating from interactions of annihilation radiation occurring within a region of said body between said first end face and said non-reflecting band.

2. A scintillation detector as defined in claim 1, said material being bismuth germanate.

3. A scintillation detector as defined in claim 1, said first and second faces being on the sides of smallest cross section.

4. A scintillation detector as defined in claim 1, said non-reflective band being formed onto the surfaces of a polished crystal for eliminating total internal reflection which normally takes place at a crystal-air interface.

5. A scintillation detector as defined in claim 1, said non-reflective band being rendered black to absorb light which would otherwise escape through said band by refraction from said prism.

6. A scintillation detector for use in detecting annihilation gamma rays resulting from positron decay of isotopes distributed within a body section, said detector comprising:
    a bismuth germanate body in the general form of a right rectangular prism having highly polished reflective surfaces except for a non-reflecting band surrounding said prism about a transverse plane of equi-probable interaction of annihilation radiation within said prism, a first end face at one end of said prism for receiving and admitting gamma rays into the interior of said prism, a second end face at the opposite end of said prism and substantially paralleling said first end face, primary light sensing means optically connected to said second end face, said first and second end faces being on the sides of said prism of smallest cross section, a third face on a side of said prism between said first end face and said non-reflecting band, and secondary light sensing means optically coupled to said third face for detecting light impinging on said third face and preferentially detecting light emanating from interactions of annihilation radiation within a region of said prism between said first end face and said non-reflecting band.

7. A scintillation detector as defined in claim 6, said non-reflective band being formed onto the surfaces of a polished crystal for eliminating total internal reflection which normally takes place at a crystal-air interface.

8. A scintillation detector as defined in claim 6, said non-reflective band being rendered black to absorb light which would otherwise escape through said band by refraction from said prism.

9. A module for use in detecting annihilation gamma rays resulting from positron decay of isotopes distributed within a body section, said module comprising:
    an array of scintillation crystals, each said crystal being in the form of a right rectangular prism formed from a dense scintillator material, said crystals being arranged in pairs on diametrically opposed sides of a circle and orientated such that a line extending through a pair of opposite corners of said prism extends radially of said circle; each said crystal of said array of crystals having:

reflective surfaces on all sides thereof except for a non-reflecting band surrounding said prism about a transverse plane of equi-probable interaction of annihilation radiation within said prism, a first end face at one end of said prism for receiving and admitting gamma rays into the interior of said prism, a second end face at the opposite end of said prism and substantially paralleling said first end face for transmitting gamma rays to a primary light sensing means, and a third face on a side of said prism between said first end face and said non-reflecting band for transmitting light to a secondary light sensing means whereby to preferentially detect light emanating from interactions of annihilation radiation within a region of said prism between said first end face and said non-reflecting band.

10. A module as defined in claim 9, further including electrical circuit means for providing a unique coded address identifying each region of each said prism such that there exists sufficient lines of coincidence response between pairs of said crystals having a unique address so as to allow reconstruction of an image of the distribution of the origin of said annihilation radiation without recourse to relative movement of said array of crystals with respect to said body section.

11. A module as defined in claim 9, said material being bismuth germanate.

12. A module as defined in claim 9, said first and second faces being on the sides of smallest cross section.

13. A module as defined in claim 9, said non-reflective band being formed onto the surfaces of a polished crystal for eliminating total internal reflection which normally takes place at a crystal-air interface.

14. A module as defined in claim 9, said non-reflective band being rendered black to absorb light which would otherwise escape through said band by refraction from said prism.

15. An apparatus for detecting annihilation radiation from positron disintegration for use in reconstructing an image of the distribution of a positron emitting isotope within said body section, comprising:

an array of detector modules, each said modules having a plurality of scintillation crystals, each said crystal being in the form of a right rectangular prism formed from a dense scintillator material, said crystals being arranged in pairs on diametrically opposed sides of a circle and oriented such that a line extending through a pair of opposite corners of said prism extends radially of said circle, said modules being disposed along a common axis so as to form a generally cylinder space for receiving a body section for study, each said crystal of said array of crystals having:

reflective surfaces on all sides thereof except for a non-reflecting band surrounding said prism about a transverse plane of equi-probable interaction of annihilation radiation within said prism, a first end face at one end of said prism for receiving and admitting gamma rays into the interior of said prism, a second end face at the opposite end of said prism and substantially paralleling said first end face for transmitting gamma rays to a primary light sensing means, and a third face on a side of said prism between said first end face and said non-reflecting band for transmitting light to a secondary light sensing means whereby to preferentially detect light emanating from interactions of annihilation radiation within a region of said prism between said first end face and said non-reflecting band; and electrical circuit means for providing a unique coded address identifying each region of each said prism such that there exists sufficient lines of coincidence response between pairs of said crystals having a unique address so as to allow reconstruction of an image of the distribution of the origin of said annihilation radiation without recourse to relative movement of said array of crystals with respect to said body section.

* * * * *